United States Patent
Chauvel

(10) Patent No.: US 7,395,413 B2
(45) Date of Patent: Jul. 1, 2008

(54) SYSTEM TO DISPATCH SEVERAL INSTRUCTIONS ON AVAILABLE HARDWARE RESOURCES

(75) Inventor: Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 295 days.

(21) Appl. No.: 10/631,585

(22) Filed: Jul. 31, 2003

(65) Prior Publication Data

US 2004/0024998 A1 Feb. 5, 2004

Related U.S. Application Data

(60) Provisional application No. 60/400,391, filed on Jul. 31, 2002.

(30) Foreign Application Priority Data

Jul. 30, 2003 (EP) .................... 03291918

(51) Int. Cl.
*G06F 9/30* (2006.01)
(52) U.S. Cl. ....................... 712/215
(58) Field of Classification Search ........... 712/215
See application file for complete search history.

(56) References Cited

U.S. PATENT DOCUMENTS

| | | | | |
|---|---|---|---|---|
| 4,713,749 A * | 12/1987 | Magar et al. ................. 712/241 |
| 5,313,586 A * | 5/1994 | Rutman ........................ 712/34 |
| 5,442,576 A * | 8/1995 | Gergen et al. ............... 708/209 |
| 5,561,775 A | 10/1996 | Kurosawa et al. |
| 5,764,939 A * | 6/1998 | Caulk, Jr. .................... 712/205 |
| 6,092,179 A * | 7/2000 | Greenberger et al. ......... 712/35 |
| 6,098,089 A | 8/2000 | O'Connor et al. ........... 709/104 |
| 6,122,653 A * | 9/2000 | Kuroda ........................ 708/320 |
| 6,173,389 B1 * | 1/2001 | Pechanek et al. .............. 712/24 |
| 6,202,143 B1 * | 3/2001 | Rim ............................. 712/210 |
| 6,230,180 B1 * | 5/2001 | Mohamed .................... 708/523 |
| 6,256,725 B1 * | 7/2001 | Batten et al. ................. 712/200 |
| 6,275,903 B1 * | 8/2001 | Koppala et al. ............. 711/132 |
| 6,556,716 B2 * | 4/2003 | Hong .......................... 382/232 |
| 6,567,905 B2 | 5/2003 | Otis ............................ 711/170 |
| 6,571,260 B1 | 5/2003 | Morris ........................ 707/206 |
| 6,820,194 B1 * | 11/2004 | Bidichandani et al. ...... 712/245 |
| 6,976,158 B2 * | 12/2005 | Catherwood et al. ........ 712/241 |
| 2002/0065990 A1 | 5/2002 | Chauvel et al. ............. 711/137 |
| 2002/0069332 A1 | 6/2002 | Chauvel et al. ............. 711/144 |
| 2003/0101320 A1 | 5/2003 | Chauvel et al. ............. 711/154 |

OTHER PUBLICATIONS

*Embedded JAVA*, Vincent Perrier, Aug. 15, 2001, (3 p.); Online http://www.onjava.com/pub/a/onjava/synd/2001/08/15/embedded.html.

* cited by examiner

*Primary Examiner*—Eddie P Chan
*Assistant Examiner*—Jacob Petranek
(74) *Attorney, Agent, or Firm*—Ronald O. Neerings; Wade J. Brady, III; Frederick J. Telecky, Jr.

(57) ABSTRACT

A processor (e.g., a co-processor) capable of executing instructions sequentially, comprises at least two functional hardware resources. When two instructions that are consecutive in program order and are executed on two separate functional hardware resources, the execution of the two instructions may be parallelized if the two instructions are within a hardware loop. The processor thus, may implement a multiply and accumulate process in an efficient manner by performing the multiply instructions concurrently with the add instructions (which require fewer cycles to complete than the multiply instructions).

30 Claims, 6 Drawing Sheets

| R0 | General Purpose (GP) |
|---|---|
| R1 | General Purpose (GP) |
| R2 | General Purpose (GP) |
| R3 | General Purpose (GP) |
| R4 | Program Counter (PC) |
| R5 | General Purpose/Local Variable Pointer (LV) |
| R6 | Stack Pointer (SP) |
| R7 | Top of Stack (ToS) |
| R8 | General Purpose/Address Index 0 (AI0) |
| R9 | General Purpose/Address Index 1 (AI1) |
| R10 | General Purpose (GP) |
| R11 | General Purpose (GP) |
| R12 | Micro-program counter (micro-PC) |
| R13 | General Purpose (GP) |
| R14 | General Purpose/Indirect Register Index (IRI) |
| R15 | Status and Control (ST) |

Figure 3

SYSTEM TO DISPATCH SEVERAL INSTRUCTIONS ON AVAILABLE HARDWARE RESOURCES

CROSS-REFERENCE TO RELATED APPLICATIONS

This application claims priority to U.S. Provisional Application Ser. No. 60/400,391 titled "JSM Protection," filed Jul. 31, 2002, incorporated herein by reference. This application also claims priority to EPO Application No. 03291927.6, filed Jul. 30, 2003 and entitled "A Multi-Processor Computing System Having A Java Stack Machine And A RISC-Based Processor," incorporated herein by reference. This application also may contain subject matter that may relate to the following commonly assigned copending applications incorporated herein by reference: "System And Method To Automatically Stack And Unstack Java Local Variables," Ser. No. 10/632,228, filed Jul. 31, 2003; "Memory Management Of Local Variables," Ser. No. 10/632,067, filed Jul. 31, 2003; "Memory Management Of Local Variables Upon A Change Of Context," Ser. No. 10/632,076, filed Jul. 31, 2003; "A Processor With A Split Stack," Ser. No. 10/632,079, filed Jul. 31, 2003; "Using IMPDEP2 For System Commands Related To Java Accelerator Hardware," Ser. No. 10/632,069, filed Jul. 31, 2003; "Test With Immediate And Skip Processor Instruction," Ser. No. 10/632,214, filed Jul. 31, 2003; "Test And Skip Processor Instruction Having At Least One Register Operand," Ser. No. 10/632,084, filed Jul. 31, 2003; "Synchronizing Stack Storage," Ser. No. 10/631,422, filed Jul. 31, 2003; Ser. No. 10/631,252, filed Jul. 31, 2003; "Write Back Policy For Memory," Ser. No. 10/631,185, filed Jul. 31, 2003; Ser. No. 10/631,205, filed Jul. 31, 2003; "Mixed Stack-Based RISC Processor," Ser. No. 10/631,308, filed Jul. 31, 2003; "Processor That Accommodates Multiple Instruction Sets And Multiple Decode Modes" Ser. No. 10/631,246, filed Jul. 31, 2003; "System To Dispatch Several Instructions On Available Hardware Resources," Ser. No. 10/631,585, filed Jul. 31, 2003; "Micro-Sequence Execution In A Processor, " Ser. No. 10/632,216, filed Jul. 31, 2003; "Program Counter Adjustment Based On The Detection Of An Instruction Prefix," Ser. No. 10/632,222, filed Jul. 31, 2003; "Reformat Logic To Translate Between A Virtual Address And A Compressed Physical Address," Ser. No. 10/632,215, filed Jul. 31, 2003; "Synchronization Of Processor States," Ser. No. 10/632,024, filed Jul. 31, 2003; "Conditional Garbage Based On Monitoring To Improve Real Time Performance, "Ser. No. 10/631, 195, filed Jul. 31, 2003; "Inter-Processor Control," Ser. No. 10/631,120, filed Jul. 31, 2003; "Cache Coherency In A Multi-Processor System," Ser. No. 10/632,229, filed Jul. 31, 2003; and "Concurrent Task Execution In A Multi-Processor, Single Operating System Environment," Ser. No. 10/632,077, filed Jul. 31, 2003.

BACKGROUND OF THE INVENTION

1. Technical Field of the Invention

The present invention relates generally to instruction execution in a processor and more particularly to an improved multiply and accumulate operation.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and requires as little memory as possible. Improvements in this area are desirable.

BRIEF SUMMARY OF THE PREFERRED EMBODIMENTS

As disclosed herein, a processor (e.g., a co-processor) includes a multiplier and an adder capable of executing instructions concurrently in which the multiplier may execute a multiply instruction and the adder may execute an add instruction. In a preferred embodiment, a multiply instruction is immediately followed by an add instruction, where in combination, the multiply and add instructions comprise multiply-accumulate "MAC" operation. Furthermore, the multiply instruction is adapted to multiply corresponding entries from two separate arrays. Each result from the multiply instruction is used in the add instruction to achieve an accumulated value. In a preferred embodiment, the execution of the add instruction on the adder is launched during the execution of the multiply instruction, preferably prior to the complete execution of the multiply instruction.

The launching of both the multiply and add instructions may be performed by a hardware loop. The hardware loop includes a plurality of iterations. In each iteration, a multiply instruction and an add instruction are executed. For example, while the multiply instruction multiplies an entry of a first array by an entry of a second array, the add instruction adds the product from a previous iteration to an accumulated value. In a first iteration of the hardware loop, the hardware loop may be capable of launching the multiply and add instructions sequentially or in parallel. In the first iteration, the multiply instruction multiples a first entry of a first array by the first entry of a second array. During the execution of the multiply instruction, the add instruction adds two zero values together because there is no previous product to accumulate. In subsequent iterations of the hardware loop, the multiple and add instructions are launched in parallel. The hardware loop may be initiated by a Repeat instruction which precedes the multiple and add instructions

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 3 shows various registers used in the JSM of FIGS. 1 and 2;

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device such as a processor. The processor described herein may be particularly suited for executing Java™ Bytecodes, or comparable code. As is well known, Java is particularly suited for embedded applications and is a relatively "dense" language meaning that on average, each instruction may perform a large number of functions compared to various other programming languages. The dense nature of Java is of particular benefit for portable, battery-operated devices that preferably include as little memory as possible to save space and power. The reason, however, for executing Java code is not material to this disclosure or the claims that follow. Further, the embodiment of the invention may be described in the context of Java, but should not be limited to the execution of only Java instructions. The processor described herein may be used in a wide variety of electronic systems (e.g., cell phones).

Figure 1:
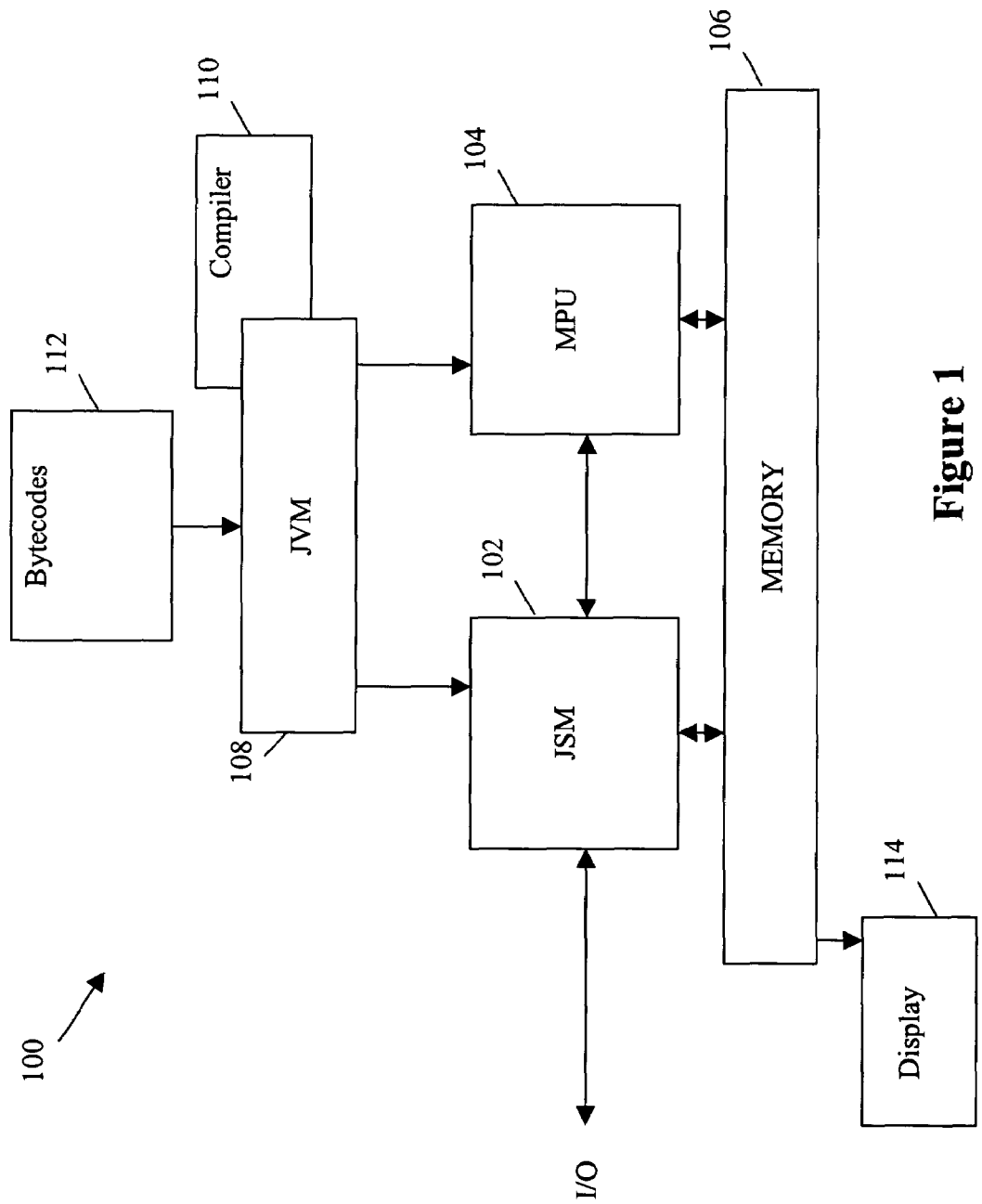
FIG. 1 shows a diagram of a system in accordance with preferred embodiments of the invention and including a Java Stack Machine ("JSM") and a Main Processor Unit ("MPU")

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may be included as well.

As is generally well known, Java code comprises a plurality of "Bytecodes" 112. Bytecodes 112 may be provided to the JVM 108, compiled by compiler 110 and/or provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown), which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web-based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, Bytecode verifier, garbage collector, and a Bytecode interpreter loop to interpret the Bytecodes that are not executed on the JSM processor 102.

In accordance with preferred embodiments of the invention, the JSM 102 may execute at least two instruction sets. One instruction set may comprise standard Java Bytecodes. As is well known, Java is a stack-based programming language in which instructions generally target a stack. For example, an integer add ("IADD") Java instruction pops two integers off the top of the stack, adds them together, and pushes the sum back on the stack. In general, the JSM 102 comprises a stack-based architecture with various features that accelerate the execution of stack-based Java code.

Another instruction set executed by the JSM 102 may include instructions other than standard Java instructions. In accordance with at least some embodiments of the invention, such other instruction set may include register-based and memory-based instructions. This other instruction set generally complements the Java instruction set and, accordingly, may be referred to as a complementary instruction set architecture ("C-ISA") such as those instructions disclosed in one or more of the previously listed co-pending applications included herein by reference. By complementary, it is meant that at least some Java Bytecodes may be replaced by micro-sequences using C-ISA instructions that permit address calculation to readily "walk through" the JVM data structures. A micro-sequence may comprise one or more C-ISA instructions. Further, such micro-sequences may also include Java Bytecode instructions. The execution of Java may be made more efficient and run faster by replacing some sequences of Bytecodes by preferably shorter and more efficient sequences of C-ISA instructions. The two sets of instructions may be used in a complementary fashion to obtain satisfactory code density and efficiency. As such, the JSM 102 generally comprises a stack-based architecture for efficient and accelerated execution of Java Bytecodes combined with a register-based architecture for executing register and memory based C-ISA instructions. Both architectures preferably are tightly combined and integrated through the C-ISA.

Figure 2:
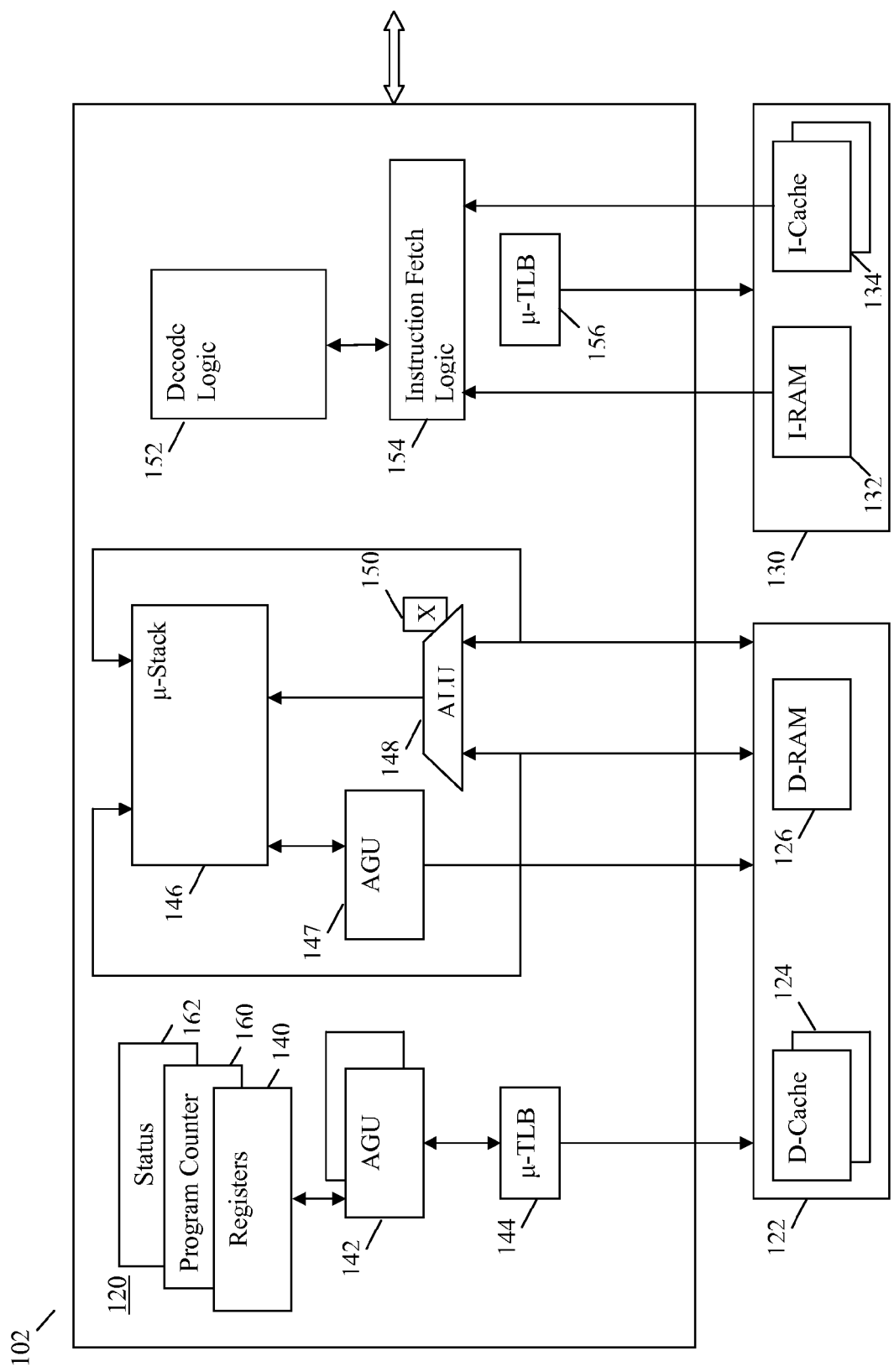
FIG. 2 shows a block diagram of the JSM of FIG. 1 in accordance with preferred embodiments of the invention.

FIG. 2 shows an exemplary block diagram of the JSM 102. As shown, the JSM includes a core 120 coupled to data storage 122 and instruction storage 130. The core may include one or more components as shown. Such components preferably include a plurality of registers 140, including a program counter 160 and a status register 162, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from data storage 122 or from the micro-stack 146, processed by the ALU 148, while instructions may be fetched from instruction storage 130 by fetch logic 154, and decoded by decode logic 152. The address generation unit 142 may be used to calculate addresses based, at least in part on data contained in the registers 140. The AGUs 142 may calculate addresses for C-ISA instructions as will be described below. The AGUs 142 may support parallel data accesses for C-ISA instructions that perform array or other types of processing. AGU 147 couples to the micro-stack 146 and may manage overflow and underflow conditions in the micro-stack preferably in parallel. The micro-TLBs 144, 156 generally perform the function of a cache for the address translation and memory protection information bits that are preferably under the control of the operating system running on the MPU 104. The decode logic 152 may be adapted to execute both the standard Java instructions as well as the C-ISA instructions of the system.

Referring now to FIG. 3, the registers 140 may include 16 registers designated as R0-R15. Registers R0-R3, R5, R8-R11 and R13-R14 may be used as general purposes ("GP") registers usable for any purpose by the programmer. Other registers, and some of the GP registers, may be used for specific functions. For example, registers R4 and R12 may be used to store two program counters. Register R4 preferably is used to store the program counter ("PC") and register R12 preferably is used to store a micro-program counter ("micro-PC"). In addition to use as a GP register, register R5 may be used to store the base address of a portion of memory in which Java local variables may be stored when used by the current Java method. The top of the micro-stack 146 is referenced in registers R6 and R7. The top of the micro-stack has a matching address in external memory pointed to by register R6. The values contained in the micro-stack are the latest updated values, while their corresponding values in external memory may or may not be up to date. Register R7 provides the data value stored at the top of the micro-stack. Registers R8 and R9 may also be used to hold the address index 0 ("AI0") and address index 1 ("AI1"). Register R14 may also be used to hold the indirect register index ("RI"). Register R15 may be used for status and control of the JSM 102.

Referring again to FIG. 2, as noted above, the JSM 102 may execute stack-based instructions and thus the JSM includes a hardware-based micro-stack 146 for storing operands. Unless empty, Java Bytecodes pop data from and push data onto the micro-stack 146. The micro-stack 146 preferably comprises the top n entries of a larger stack that may be implemented in data storage 122. Although the value of n may be vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure.

The ALU 148 adds, subtracts, and shifts data and may be adapted to completely execute instructions in less than two cycles. The multiplier 150 may be used to multiply two values together in one or more cycles. The execution of instructions on the ALU 148 and the multiplier 150 is described in more details below. The instruction fetch logic 154 generally fetches instructions from instruction storage 130. The instructions may then be decoded by decode logic 152.

The data storage 122 generally comprises data cache ("D-cache") 124 and data random access memory ("D-RAMset") 126. Reference may be made to copending applications U.S. Ser. Nos. 09/591,537 filed Jun. 9, 2000, 09/591,656 filed Jun. 9, 2000, and 09/932,794 filed Aug. 17, 2001, all of which are incorporated herein by reference. The stack (excluding the micro-stack 146), arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAMset 132 may be used for relatively complex micro-sequenced Bytecodes or other micro-sequences or critical sequences of codes. The I-cache 134 may be used to store other types of Java Bytecode and mixed Java/CISA instructions.

Figure 4:
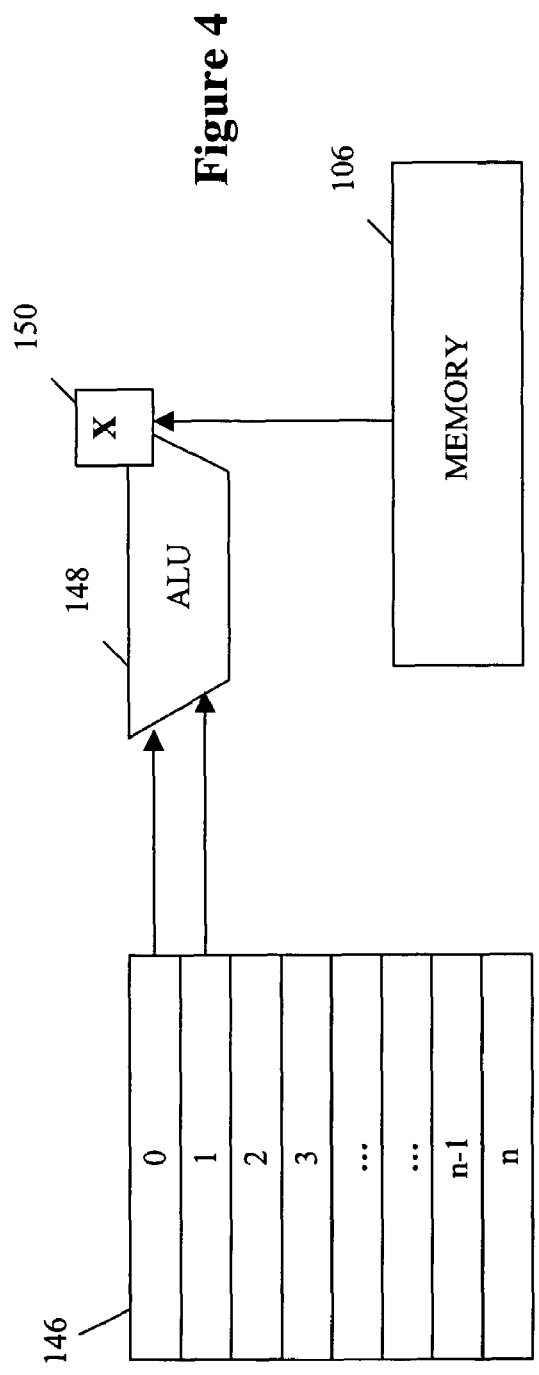
FIG. 4 illustrates a block diagram of functional hardware resources utilized in a MAC operation.

Referring to FIG. 4, the micro-stack 146 may include a plurality of entries (labeled 0 through n). Each entry of the micro-stack 146 contain an operand that may be utilized by an instruction (e.g., IADD, IMUL, etc.) fetched from an instruction cache. In addition, memory 106 may include at least two arrays of operands, where the operands may be utilized by an instruction (e.g., IADD, IMUL, etc.). The execution of the instruction may be done on a functional hardware resource such as the multiplier 150 and the ALU 148 coupled to the micro-stack 146 and to the memory 106. Accordingly, the data corresponding to the instructions may be stored in either the micro-stack 146 or the memory 106. For example, the execution of an integer multiply ("IMUL") Java instruction may correspond to the first two entries, 0 and 1, of the micro-stack. Thus, the data from the first two entries may be "popped" out of the micro-stack and provided to the multiplier 150 for execution. Upon the completion of the IMUL instruction, the product of the first two entries is "pushed" back upon the stack. Similarly, micro-stack may contain data corresponding to an IADD instruction. For example, the first two entries of the stack is "popped" out of the micro-stack and provided to the ALU 148 for execution. Upon the completion of the IADD instruction, the sum of the first two entries is "pushed" back upon the stack.

As is well known, Java Bytecodes are executed sequentially. Consequently, if a data or hardware dependency is determined between instructions, the execution of a previous instruction must be completed before a sequential instruction is executed. A data dependency, as described herein, is when the result of a previous instruction, e.g., a product or a sum, is needed to execute a succeeding instruction. For example, a multiply-accumulate ("MAC") operation comprises a series of multiply instructions that multiply a plurality of entries from two arrays and accumulates the products to obtain an accumulated value. However, the sum of the products cannot be determined until the complete execution of the corresponding products. Hence, an add instruction may not be launched until the multiply instruction is completed. A hardware dependency is when a functional hardware resource, e.g., an adder or a multiplier, is needed in two consecutive instructions such that execution of the second instruction can not be started until the complete execution of the first instruction. In some embodiments, the ALU 148 and the multiplier 150 each may take more than one cycle to execute an instruction. Thus, by sequentially launching the execution of instructions, the number of cycles to complete the execution of a plurality of instructions undesirably increases.

Figure 5:
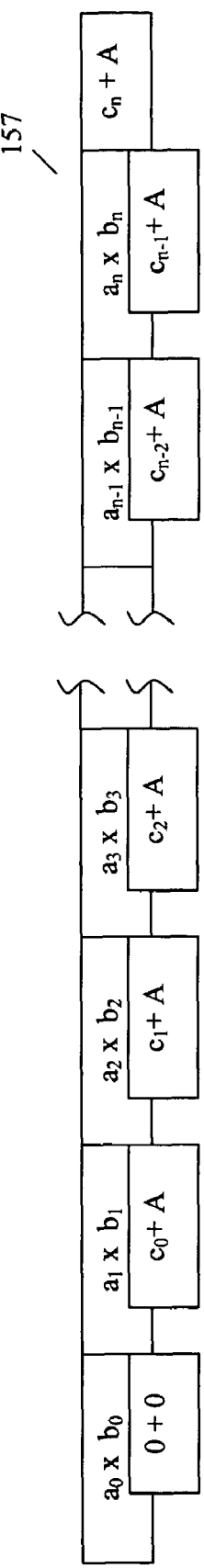
FIG. 5 illustrates a parallelization of instructions executed on separate function hardware resources.

The, MAC operation, as described above, does not have a hardware dependency. For example, referring to FIG. 4, an add instruction may be executed on the ALU 148 while a multiply instruction may be executed on the multiplier 150. Furthermore, the values for the add instruction may be provided by the micro-stack 146 coupled to the ALU 148, where the values for the multiply instruction may be provided by the memory 106. Thus, the MAC operation may be "paralleled." Referring to FIG. 5, a MAC operation is shown where the multiply instruction is executed concurrently with an add instruction. In a preferred embodiment, the multiply instruction multiplies entries from a first array, $a_0$ through $a_n$, from the first array are multiplied with corresponding entries from a second array, $b_0$ through $b_n$, to produce product terms $c_0$ through $c_n$. Each array contains 0 through n entries (n+1 total entries). The add instruction adds each product term, $c_0$ through $c_n$, to an accumulated value A. A multiply instruction may be provided to the multiplier 150 where the add instruction may be provided to the ALU 148. In order to ensure that the data dependency between the multiply instruction and the add instruction is handled correctly, the product of a previous multiply instruction is added to the accumulated value during the execution of subsequent multiply instruction. Referring still to FIG. 5, the addition of $c_0$ (where $c_0$ is the result of the previous multiplication $a_0 \times b_0$) to the accumulated value, A, preferably is executed concurrently with the multiplication of $a_1 \times b_1$, and so forth.

In addition, a plurality of instructions may be executed concurrently during the execution of the multiply instruction of the MAC operation. In a preferred embodiment, the multiplier 150 may take two cycles to complete the execution of a multiply instruction, where the ALU 148 may take one cycle to completely execute an add instruction. Thus, the ALU 148 may execute two instructions, such as an add instruction and a Shift operation, concurrently with the multiplier 150.

In a preferred embodiment, a hardware loop initiates the launching of the multiply and add instructions for a MAC operation to ensure all entries of the first and second arrays (e.g., $a_0$ through $a_n$ and $b_0$ through $b_n$) are properly processed (multiplied and added). The hardware loop may have a plurality of iterations, each iteration launches a multiply instruction and an add instruction. In a first iteration of the process, the hardware loop launches the execution of the multiply instruction that multiplies the first entries of the two arrays. During the execution of the multiply instruction, the hardware loop may launch the execution of the add instruction. In other words, the executing of the add instruction before completing the execution of the multiplication instruction is handled by the hardware loop. The add instruction adds two zero values together because, during the first iteration, no previously calculated product or accumulated value yet exists. These two zero values are previously stored with the micro-stack outside the loop by the program whose loops have been rearranged by a compiler. In subsequent iterations of the hardware loop, the hardware loop may execute the multiply instruction concurrently with the add instruction because there is no functional hardware being shared. In each such subsequent iteration, the ALU 148 accumulates the previous iteration's product while calculating a product term to be used in the next iteration. As such, the total time to compute the resulting accumulated value is generally the time required to execute all the multiply instructions and a single add instruction that adds the last product (e.g., $c_n$) to the accumulated value. All other adds are performed in parallel with the multiply instructions.

Figure 6:
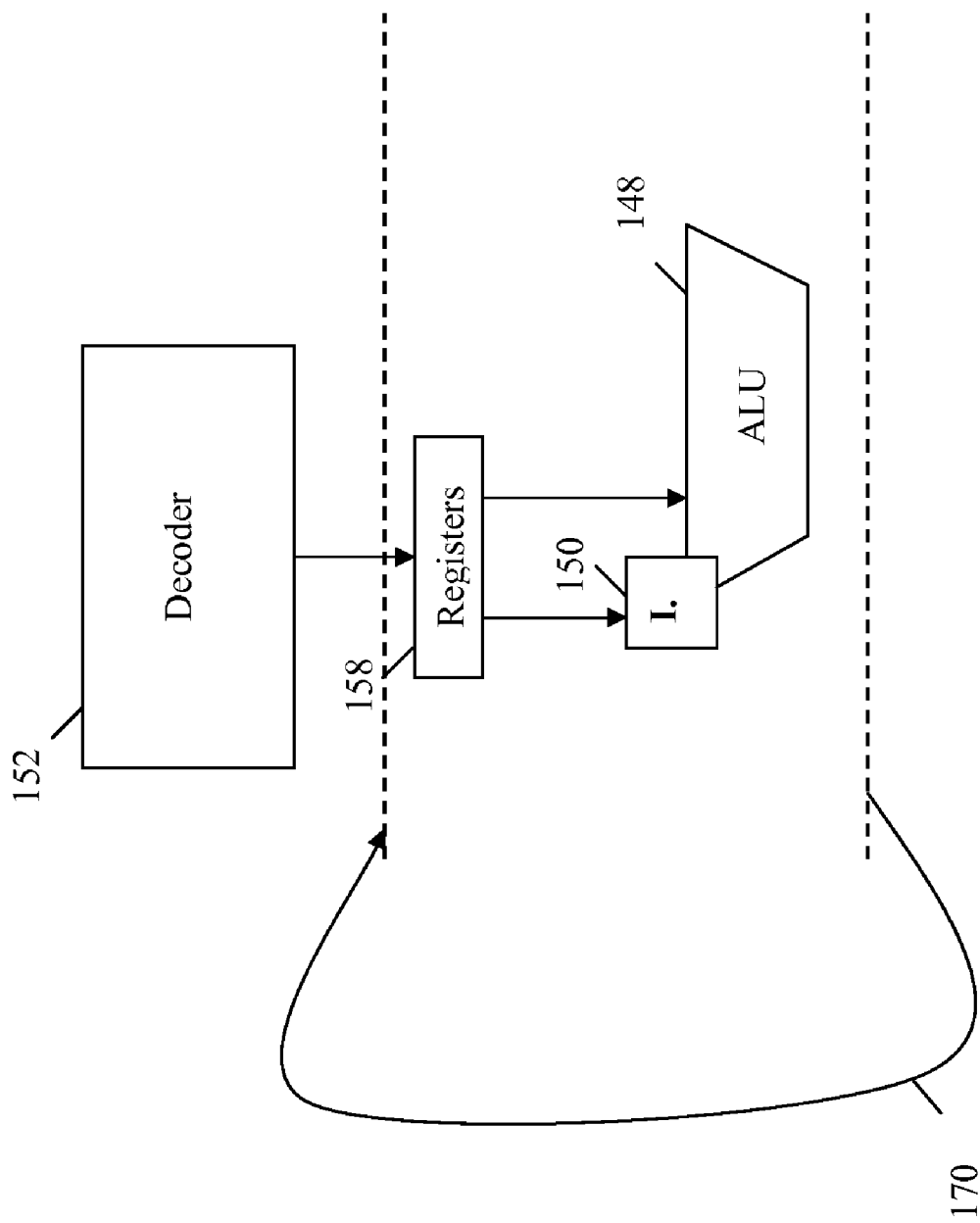
FIG. 6 illustrates the operation of a Repeat instruction during a MAC operation.

The hardware loop may be initiated by a Repeat instruction and the detection of such parallelization of such instructions is triggered by the Repeat instruction. In a preferred embodiment, execution of the Repeat instruction precedes the multiply and add instructions. Thus, the decoder 152 may first decode the Repeat instruction prior to decoding the multiply and add instructions. Referring to FIG. 6, the decoder 152 receives instructions from the instruction cache (not specifically shown) and decodes them. In one embodiment, the decoder receives the Repeat instruction that initiates the hardware loop. During the first iteration of the loop the multiply and add are still decoded sequentially and placed into the instruction registers 158. In other words, in at least some embodiments, the first iteration of the hardware loop launches the step of executing the first and second instruction sequentially. Thus, for each of the MAC's multiply and add instructions that follow the first iteration of the Repeat instruction, the execution of the multiply and add instructions are "parallelized." The instruction registers 158 may have an allotment for both an add instruction and a multiply instruction. Once the decoder 152 has decoded and stored both the add and multiply instructions, the add and multiply instructions cause the ALU 148 and the multiplier 150 to operate as described above. As explained the multiply and add are initially decoded sequentially removing the need of duplicating logic in the decode logic 152. After the completion of the execution, the processor repeats the paralleled execution of the multiply and add instructions, as denoted by the path 170 until the last entry of the arrays are multiplied. Thus, for each iteration of the hardware loop, two separate and distinct functional hardware resources are utilized to execute two instructions concurrently. Following the last iteration of the hardware loop, an add instruction is executed via the ALU 148 in which the final product from the hardware loop is added to the accumulated value (not specifically shown).

By utilizing a hardware loop to initiate the execution of two instructions in parallel on two separate functional hardware allows for the maximization of hardware resources. In particular, a functional hardware may not have to be idle during the execution of an instruction on separate function hardware. The efficient usage of the resources allows for the execution flow of instructions to be maximized. Thus, the cycle time to calculate an accumulate value may be dependant on the execution time of the functional hardware that takes the more cycles to complete compared to a sequentially launching of the instructions.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

Figure 7:
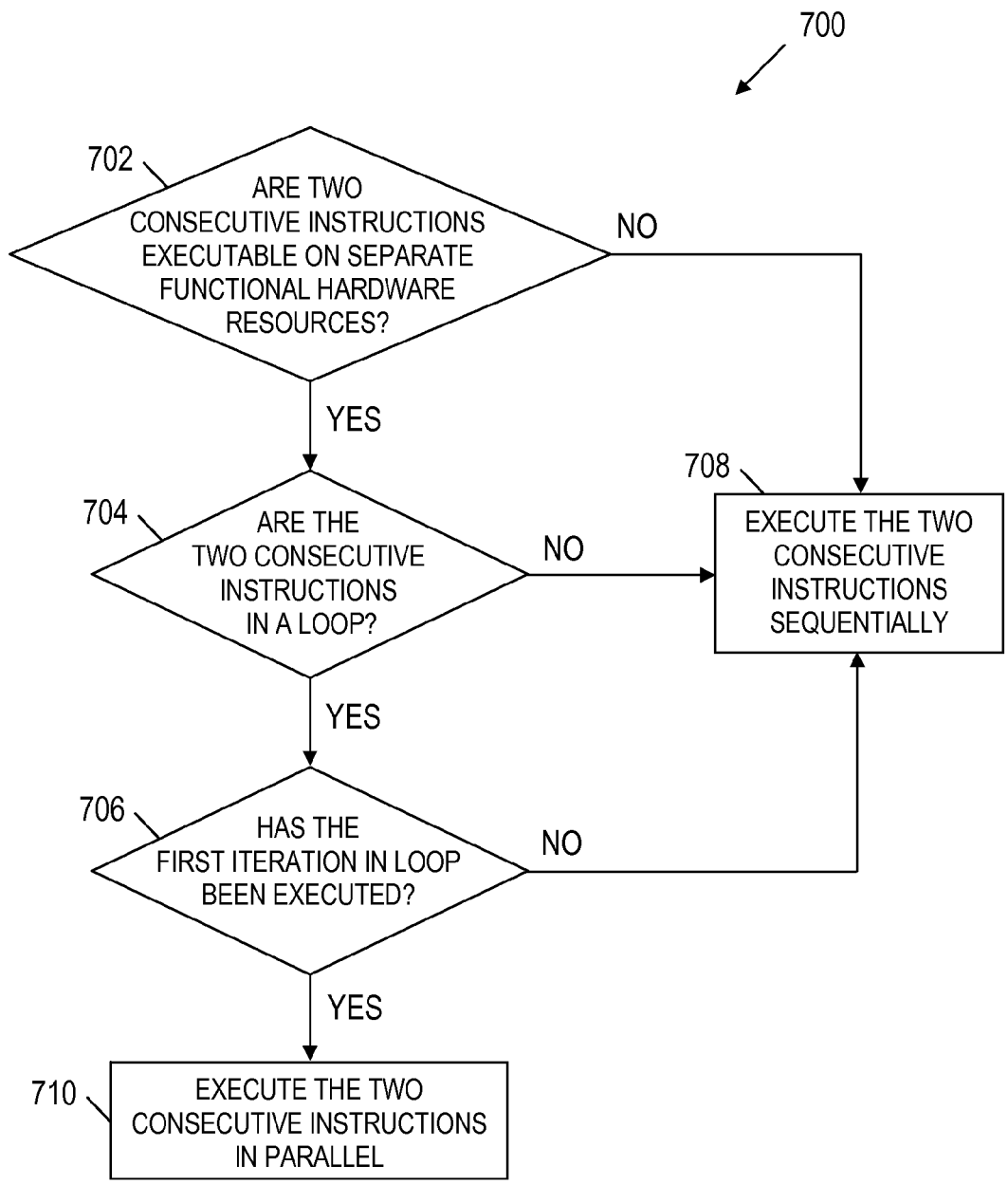
FIG. 7 shows a method in accordance with embodiments of the invention.

FIG. 7 shows a method 700 in accordance with embodiments of the invention. As shown in FIG. 7, the method 700 comprises determining if two consecutive instructions are executable on separate functional hardware resources (determining block 702), determining if the two consecutive instructions are in a loop (determination block 704), and determining if the first iteration in the loop has been executed (determination block 706). If any of the determination blocks 702, 704, 706 is not true, the two consecutive instructions are executed sequentially (block 708). If all the determination blocks 702, 704, 706 are true, the two consecutive instructions are executed in parallel (block 710).

What is claimed is:

1. A method, comprising:
   executing a multiply instruction on a first functional hardware;
   executing an add instruction on a second functional hardware; and
   wherein the multiply and add instructions are consecutive in program order but are selectively permitted to be paralleled when executed, and wherein the add instruction completes before completing the multiply instruction;
   determining to parallelize the multiply and add instructions if multiply and add instructions are within a hardware loop;
   the hardware loop initiating the execution of the multiply and add instructions; and
   in each iteration, other than a first and last iteration, of the hardware loop, the multiply instruction multiplying an entry from a first array and an entry from a second array resulting in a product in parallel with the add instruction adding a previous product and an accumulated value coming from a previous loop iteration which results in a new accumulated value.

2. The method of claim 1, wherein the combination of the multiply and add instructions operates a MAC operation.

3. The method of claim 1, wherein the first functional hardware is a multiplier.

4. The method of claim 1, wherein the second functional hardware is an adder.

5. The method of claim 1, wherein the new accumulated value is put onto a stack.

6. The method of claim 1, wherein a first iteration of the hardware loop launches the execution of the multiply and add instructions sequentially.

7. The method of claim 1, wherein the parallelization is initiated by the hardware loop being controlled by a Repeat instruction.

8. A processor, comprising:
   a multiplier adapted to execute a multiplication instruction;
   an adder coupled to the multiplier and wherein the adder is adapted to execute an add instruction; and
   wherein if the multiplication and add instructions are determined to be consecutive in program order and within a hardware loop, executing the add and multiplication instructions in parallel;
   wherein in each iteration, other than a first and last iteration, of the hardware loop, the multiplication instruction multiples an entry from a first array and a second array that results in a product concurrently with the addition instruction adding a previous product to an accumulated value coming from a previous loop iteration resulting in a new accumulated value and where the new accumulated value is put onto a stack.

9. The processor of claim 8, wherein a first iteration of the hardware loop launches the add instruction and the multiplication instruction sequentially, wherein the add instruction adds two zero values in parallel with the execution of the multiplication instruction.

10. The processor of claim 8, wherein a first iteration of the hardware loop launches the add instruction and the multiplication instruction in parallel, wherein the add instruction adds two zero values in parallel with the execution of the multiplication instruction.

11. The processor of claim 8, wherein the execution of the add instruction completes before the multiplication instruction.

12. A system, comprising:
    a main processor;
    a co-processor coupled to the main processor, the co-processor comprising:
      a multiplier adapted to execute multiplication instructions;
      an adder coupled to the multiplier, wherein the adder is adapted to execute add instructions; and
      wherein if a multiplication instruction and an add instruction are determined to be consecutive in program order and within a hardware loop, executing the add instruction before completing the execution of the multiplication instruction;
      wherein in a first iteration of the hardware loop, a multiplication instruction multiples a first entry and a second entry resulting in a product concurrently with an add instruction that adds two zero values resulting in an accumulated value; and
      wherein in a second iteration, other than a last iteration, of the hardware loop, the multiplication instruction multiples a third entry and a fourth entry concurrently with the add instruction adding said product to the accumulated value.

13. The system of claim 12, wherein the executing of the add instruction before completing the execution of the multiplication instruction is handled by the hardware loop.

14. The system of claim 13, wherein the hardware loop comprises of a plurality of iterations, wherein in each iteration, additional multiplication and add instructions are executed in parallel, resulting in an accumulated value.

15. The system of claim 14, wherein in each iteration of the hardware loop, the execution of the add instruction completes before the execution of the multiplication instruction completes.

16. The system of claim 12, wherein the hardware loop is initiated by a Repeat instruction.

17. The system of claim 12, wherein the system comprises a cellular telephone.

18. A processor, comprising:
    a multiplier;
    an adder; and
    an instruction decoder;
    wherein, during a first iteration of a multiply-and-accumulate operation in a hardware loop, the instruction decoder decodes a multiply instruction and an add instruction sequentially,
    wherein, during subsequent iterations, other than a last iteration, of the multiply-and-accumulate operation in the hardware loop, the multiplier and the adder operate in parallel with the adder performing an add based on a multiplication performed during a previous iteration.

19. The processor of claim 18 wherein, following a last iteration of the multiply-and-accumulate operation, the multiplier does not operate and the adder adds a product from a multiplication performed during a previous iteration to an accumulated value.

20. The processor of claim 18 wherein the multiply-and-accumulate operation is completed within a duration in which the multiplier performs a plurality of multiplication instructions plus a duration in which the adder performs one add instruction.

21. The processor of claim 18 further comprising comprises a stack and a memory device wherein, during the multiply-and-accumulate operation, the multiplier receives values from the memory device and the adder receives values from the stack.

22. The processor of claim 21, wherein during the first iteration of the multiply-and-accumulate operation, the stack provides two zero values to the adder.

23. The processor of claim 21 wherein, during the multiply-and-accumulate operation, the adder repeatedly pops a value from the stack for each add and pushes an accumulated value back to the stack after each add.

24. The processor of claim 18 wherein the multiply-and-accumulate operation is performed based on a Repeat instruction that is decoded by the instruction decoder.

25. The processor of claim 24 wherein the instruction decoder decodes the Repeat instruction prior to decoding a multiply instruction and an add instruction associated with the multiply-and-accumulate operation.

26. The processor of claim 18 wherein, during the first iteration of the multiply-and-accumulate operation, the multiplier multiplies two values and the adder performs a no-op.

27. The processor of claim 18 wherein, during the first iteration of the multiply-and-accumulate operation, the multiplier multiplies two values and the adder adds two zeros values.

28. The processor of claim 18 wherein the multiplier takes two cycles to complete a multiplication instruction and the adder takes one cycle to complete an add instruction.

29. The processor of claim 18 wherein the adder is part of an arithmetic logic unit (ALU) and wherein the ALU completes an add instruction and a shift operation while the multiplier completes a multiplication.

30. The processor of claim 18 wherein the instruction decoder is configured to decode the multiplication instruction and the add instruction one at a time.

* * * * *